Patented May 2, 1933

1,906,917

UNITED STATES PATENT OFFICE

KURT PETERS, OF MULHEIM-ON-THE-RUHR, AND KURT WEIL, OF BONN-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS OF SEPARATION OF MIXTURES OF THE RARE GASES

No Drawing. Application filed January 6, 1931, Serial No. 507,042, and in Germany January 7, 1930.

The method of preparing mixtures of krypton and xenon by adsorption of the same is known and has been described by Valentiner and Schmidt in Berichte der Berliner Akademie der Wissenschaften, 1905, 816. By this method crude argon containing krypton and xenon is contacted with charcoal, cooled to $-120°$ C.; krypton and xenon are adsorbed relatively intensively, argon only slightly. According to German Patent 415,905 cooled gaseous oxygen, obtained from an air separation apparatus, is passed over adsorbents for the concentration of krypton and xenon. According to German Patent 169,514 mixtures of gases are adsorbed by charcoal at a temperature roughly corresponding to the boiling point of the lowest boiling gas; the temperature of the charcoal is then slowly raised and the gases, released from the charcoal by the rise of temperature, are collected separately. A quantitative separation of the gas mixtures, however, could not be achieved, either by one of these processes or by fractional distillation. A combined application of other known methods leads only to a partial production of the heavy rare gases.

Our invention solves the problem to split up gas mixtures quantitatively into their individual components at the same time achieving a complete isolation of the constituents. The essential and new features of this process consist in the steps firstly to absorb the gas mixture at a low temperature by a sufficient quantity of adsorbents, e. g. active charcoal or active silicic acid, and then removing the individual components by exhausting at greatly diminished pressure, the temperature being chosen so that the more volatile component already possesses a pressure sufficient for removing it completely from the adsorbents, whereas the less volatile component shows no appreciable tension over the adsorbent.

In our process we make use of two facts:

1. The adsorption takes some time. An appreciable enrichment of the heavier constituents, while passing a gas mixture over a cooled adsorbent, can therefore be only obtained by reducing the velocity of the gas stream to almost a minimum. The separation cannot be performed by an adsorption process, but only by removing the adsorbed gas from the adsorbent by heating.

2. The tension curves of the gases over the adsorbents take an exponential course.

As regards the expulsion process, the following may be said: At a relatively high total pressure of a gas mixture over the adsorbent, as is the case e. g. when passing it over adsorbents at atmospheric pressure, (as in the usual expulsion processes), the proportion of the partial pressure over the adsorbent of the heavier component to that of the lighter component is indeed small but usually so high, that, if a small quantity of the heavier constituent is present, this one together with the lighter constituents becomes lost. However, if one chooses the temperature low enough so that the heavier constituent in the gases over the adsorbent possesses no appreciable pressure, then the proportion of the partial pressure of the heavier to that of the lighter component, according to the course of the tension curves, is many times lower. The pressure of the lighter component can therefore already be sufficient for its quantitative removal, whereas the heavier constituent remains adsorbed. In accordance with the nature of the gases the range of temperature, in which a quantitative separation is possible, is larger or smaller.

For every gas mixture this range of temperature must be ascertained by experiment.

For the separation of neon, helium, argon, krypton and xenon we have ascertained the following temperatures (see table).

| Range of temperature | Optimal temperature | Pressure over the adsorbent ranging from 0.01 to 10 mm Hg | |
|---|---|---|---|
| | | Quantitatively separable | Nonremovable |
| | $-185°$ | Ne-He | Ar, Kr, X |
| $-129°$ to $-92°$ | $-93°$ | Ar | Kr, X |
| $-92°$ to $-72°$ | $-78°$ | Kr | X |
| $-72°$ to $60°$ | $60°$ | X | |

Under these conditions the manner of adsorbing and the quality of the adsorbents is immaterial. Active silicic acid, or adsorption charcoal, can be used with advantage. They are introduced into the rectification apparatus at any suitable place cool enough to liquefy oxygen during the air liquefaction or separation process.

*Examples*

(1) A mixture of 100 parts of argon, 1 part of krypton and 0.1 part of xenon is adsorbed at the temperature of liquid air by 3 gms. of active charcoal for every 100 cubic centimetres of the gas mixtures. Thereon, the temperature of the charcoal (for instance by means of a so-called aluminium-block thermostat) is slowly raised while continually exhausting. At about $-93°$ the temperature is held constant until no more gas can be exhausted. (A mercury diffusion pump is suitable for this purpose, a rotary oil pump or Toepler pump being employed as pre-vacuum pump.) The gas exhausted up to $-93°$ is pure argon. On continuing exhausting while heating to $-78°$ C., pure krypton is pumped off, finally, the remaining gas evacuated up to normal temperature is pure xenon. The entire operation can be carried out, depending upon the amount of adsorbent used and the amount of the gas mixture, in from half an hour to three hours.

(2) A synthetic gas mixture, prepared from 40.4 cm³ of pure argon and 10.4 cm³ of pure krypton, was adsorbed at $-185°$ C. by 10 gms. of active charcoal. It was exhausted at $-93°$ and at $-78°$ as described in Example 1. At $-93°$ 40.5 cm³ of a gas with the density 1.378 (argon) (density of air=1), at $-78°$ 10.3 cm³ of krypton (density 2.82) were obtained.

(3) 100 cm³ of liquid argon containing owing to its origin 0.01% krypton and 0.001% xenon were brought into contact with 10 gms. of charcoal at $-185°$ C. and left in contact for half an hour. The argon was then exhausted by an oil pump, taking care that the temperature did not rise above $-93°$. The rest of the adsorbed gas consists of practically pure krypton and xenon, which can be separated as described.

We claim:

1. The process for separating mixtures of rare gases, which comprises contacting the gas mixture with adsorbing means at the temperature of liquid air and expelling the adsorbed gases separately, while maintaining the pressure within the limits of 0.01 to 10 mm Hg., by heating the adsorbing means gradually to a temperature, at which the tension of one of the adsorbed gases is almost nought, whereas the tension of the other gas (or mixture of gases) is sufficient for removing it from the adsorbent.

2. The process for separating argon, krypton and xenon which comprises contacting said gases with adsorbent means at the temperature of liquid air, and then expelling at a pressure of about 0.1 mm Hg firstly the argon by heating the adsorbent to a temperature between $-129°$ and $-92°$, then the krypton by heating to a temperature between $-92°$ and $-78°$ and lastly xenon by heating to higher temperatures.

In testimony whereof, we affix our signatures.

KURT PETERS.
KURT WEIL.